(12) United States Patent
Meyer (10) Patent No.: US 11,181,354 B1
(45) Date of Patent: Nov. 23, 2021

(54) COUNTERSINK GO/NO-GO GAUGE FOR A RIVET

(71) Applicant: Government of the United States, as represented by the Secretary of the Air Force, Wright-Patterson AFB, OH (US)

(72) Inventor: Charles Meyer, Gulf Breeze, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/192,971

(22) Filed: Mar. 5, 2021

Related U.S. Application Data (62) Division of application No. 16/180,065, filed on Nov. 5, 2018, now Pat. No. 10,982,943.

(51) Int. Cl.
*G01B 3/50* (2006.01)
*B21J 15/38* (2006.01)
*B21J 15/02* (2006.01)

(52) U.S. Cl.
CPC ............ *G01B 3/50* (2013.01); *B21J 15/38* (2013.01); *B21J 15/02* (2013.01)

(58) Field of Classification Search
CPC ....... G01B 3/28; G01B 3/50; Y10T 29/49771; Y10T 29/49943; Y10T 29/49956; Y10T 29/5118
See application file for complete search history.

(56) References Cited

U.S. PATENT DOCUMENTS 4,996,492 A * 2/1991 Anderson ............. G01B 7/13
324/662

* cited by examiner

*Primary Examiner* — Jason L Vaughan
*Assistant Examiner* — Amanda Kreiling
(74) *Attorney, Agent, or Firm* — AFMCLO/JAZ; Matthew D. Fair (57) ABSTRACT

A countersink go/no-go gauge is configured to aid a determination of whether a countersink aperture for a rivet is formed to a desired depth. The countersink go/no-go gauge includes a head having a depth defined between a top surface and a bottom surface and a shaft extending from the top surface of the head. The depth of the head is substantially equal to a desired depth of a countersink aperture. In some embodiments the go/no-go gauge includes tolerance features to provide a range for an acceptable countersink depth.

18 Claims, 9 Drawing Sheets

COUNTERSINK GO/NO-GO GAUGE FOR A RIVET

This application is a divisional application of prior filed co-pending application Ser. No. 16/180,065 filed on Nov. 5, 2018.

RIGHTS OF THE GOVERNMENT

The invention described herein may be manufactured and used by or for the Government of the United States for all governmental purposes without the payment of any royalty.

TECHNICAL FIELD

The present disclosure generally relates to a rivet countersink gauge, and more particularly, but not exclusively to a Go/No-Go gauge for a rivet countersink or the like.

BACKGROUND

Countersink dimensions for fastening apertures formed in structural walls must be precise within a predetermined tolerance band for the fastener to function as designed. In particular, the depth of the countersink must be machined into the wall within a tight tolerance band so that the head of the fastener is substantially flush with the surface of an outer structural wall (typically sheet metal) after installation. In past practice machinists have used an actual rivet as a gauge by placing it in the countersink aperture to determine if the depth of the countersink is acceptable. Oftentimes the rivet would get stuck or otherwise become difficult to remove when the countersink depth is too large. The checking and removal of the rivet causes delay and wasted time in the manufacturing process. Accordingly, there remains a need for further contributions in this area of technology.

SUMMARY

One embodiment of the present disclosure includes a go/no-go gauge for a countersink formed in a structure such as sheet metal or the like. Other embodiments include apparatuses, systems, devices, hardware, methods, and combinations for a go/no-go gauge suitable for a technician to determine whether a countersink is formed at a desired depth such that an outer surface of a rivet or threaded fastener is positioned flush with the outer surface of the structure after assembly. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended by the illustrations and descriptions of the illustrative embodiment(s). Any alterations and further modifications in the described embodiments, and any further applications of the principles of the invention as described herein are contemplated as would normally occur to one skilled in the art to which the invention relates.

Figure 1:
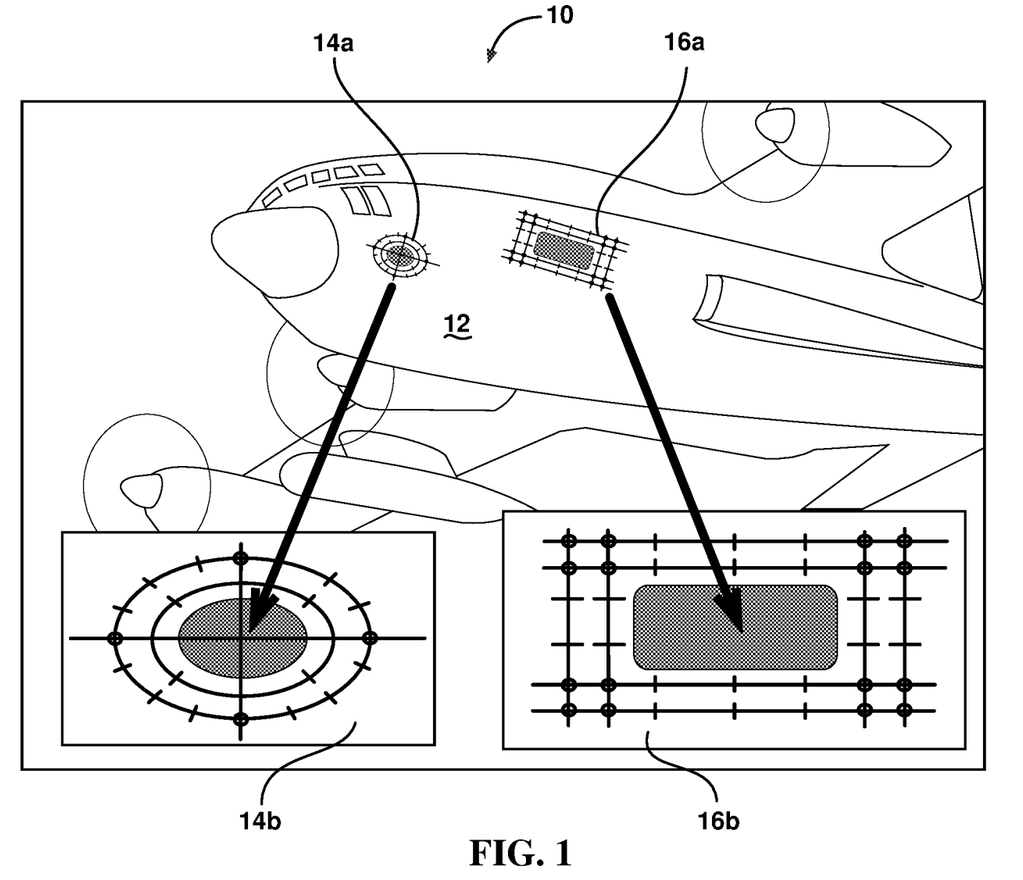
FIG. 1 is a schematic view of an exemplary airplane showing projected enlarged surface regions to be repaired according the methods, apparatus and systems disclosed in the present application.

Referring now to FIG. 1, an aircraft 10 is illustrated as an exemplary system whereby rivets are used in the manufacturing process and/or a repair process. It should be understood that the apparatus, method and system disclosed herein can be used with any structure whereby rivets are used to mechanically fasten structural components together. In one form the structural components can include a sheet metal skin and a substructure. Other forms can include alternative material construction such as by way of example and not limitation plastics, composites, metal matrix composites, ceramic matrix composites or others types as would be known to one skilled in the art. The aircraft 10 includes an outer structure 12 commonly referred to as "skin" which is typically a relatively thin sheet metal made from aluminum or the like. The outer structure 12 is riveted to a substructure (not shown) along the surface thereof. Over time the skin or rivets can become damaged by external impact or simply fail through normal operational use due to low or high cycle fatigue. In the illustrative embodiment, the outer structure 12 is shown having a first repair region 14a (enlarged 14b) and a second repair region 16a (enlarged 16b). The methods, systems and apparatus disclosed herein can be used to repair the regions 14a and 16a as will be described below. It should be noted that the methods, systems and apparatus disclosed herein can also be used for initial manufacturing of any apparatus that include rivets for mechanically joining components together.

Figure 2:
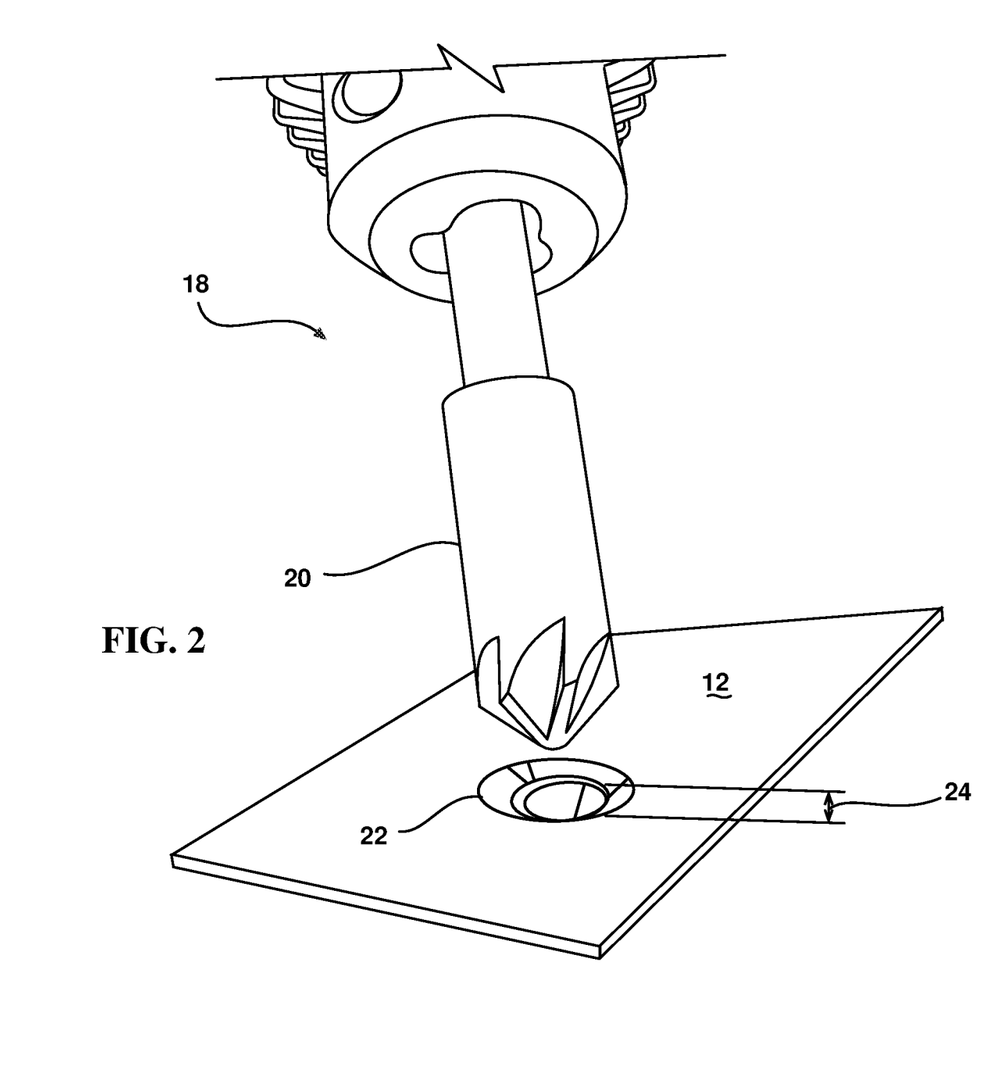
FIG. 2 is a schematic view of a tool used to form a countersink into a top structure for receiving a rivet according to one exemplary embodiment of the present disclosure.

Referring now to FIG. 2, a rotary tool 18 having a rivet countersink bit 20 can be used to form a countersink aperture 22 in the outer structure 12. The countersink aperture 22 is defined at least partially by a chamfer depth 24 that is defined as the distance between the top and bottom of the countersink aperture 22. The chamfer depth 24 must be formed within a predetermined tolerance band for a rivet to function properly. If a rivet is inserted into a countersink aperture 22 that is too deep or too shallow, then the rivet must be removed to permit further machining or repair via additive processing to form a correctly sized countersink aperture 22. The process of placing a rivet in a countersink aperture and having to remove the rivet if the counter sink aperture 22 is incorrect in size can be time consuming and in some cases when the aperture 22 is too large, the rivet can be particularly difficult to remove because the head cannot be grasped with a tool or by hand.

Figure 3:
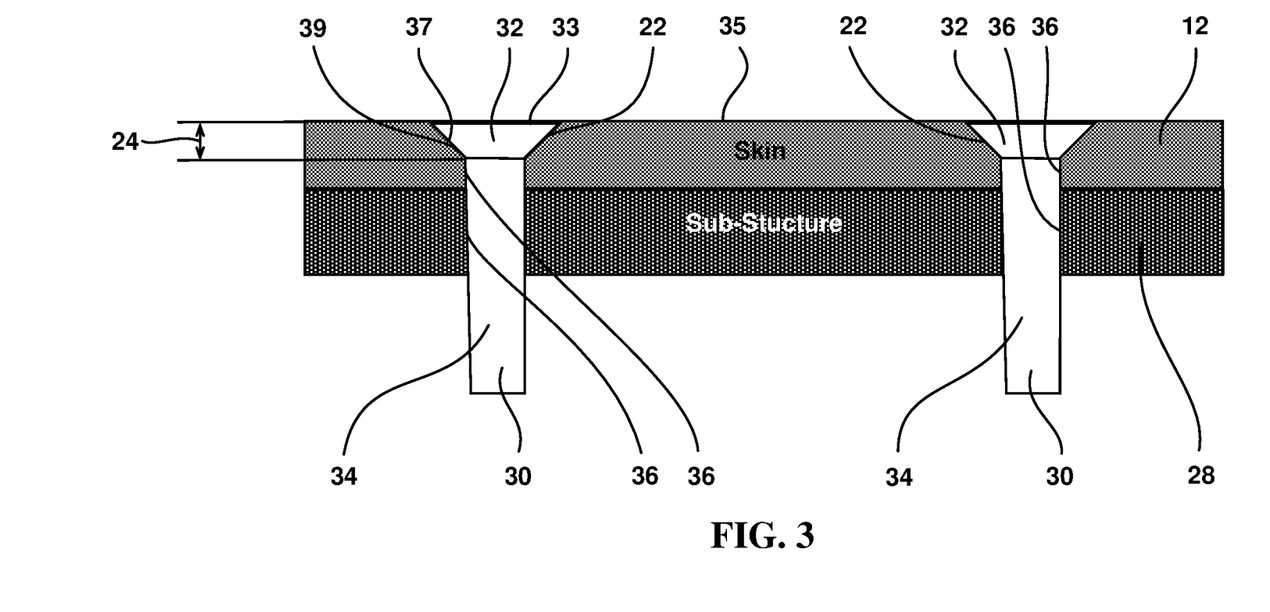
FIG. 3 is a cross sectional view of a portion of an apparatus having a substructure and a top structure connected together with a pair of rivets.

FIG. 3 shows a schematic cross-sectional view of an outer skin structure 12 connected to a substructure 28 via rivet means 30. The rivet 30 includes a conical head 32 with a shaft or body 34 extending therefrom. The conical head 32 of the rivet 30 includes an outer surface 33 that should be substantially flush with the top surface 35 of the outer structure 12 when installed correctly. The shaft of the rivet 30 is positioned through the apertures 36 formed in the outer structure 12 and the sub structure 28. The angled surface 37 of the countersink 22 is engaged by an angled lower wall 39 of the rivet head 32 when the rivet is installed. The depth of the chamfer 24 for the countersink 22 should be formed so that the outer surface of the head 32 is substantially flush with the top surface 35 of the outer structure 12. It should be noted that the term substantially flush means flush within a predetermined tolerance band. In one form the tolerance band may be +/−0.001 inches. In other forms the tolerance band may be +/−0.010 inches. In other forms the tolerance band may be +/−.100 inches or even greater. It should be understood that the tolerance band requirements can be different in various industries. For example in the aerospace industry, the tolerance band requirements for rivet construction are typically much tighter than the tolerance requirements for the automotive, rail or water vessel industries.

Figure 4:
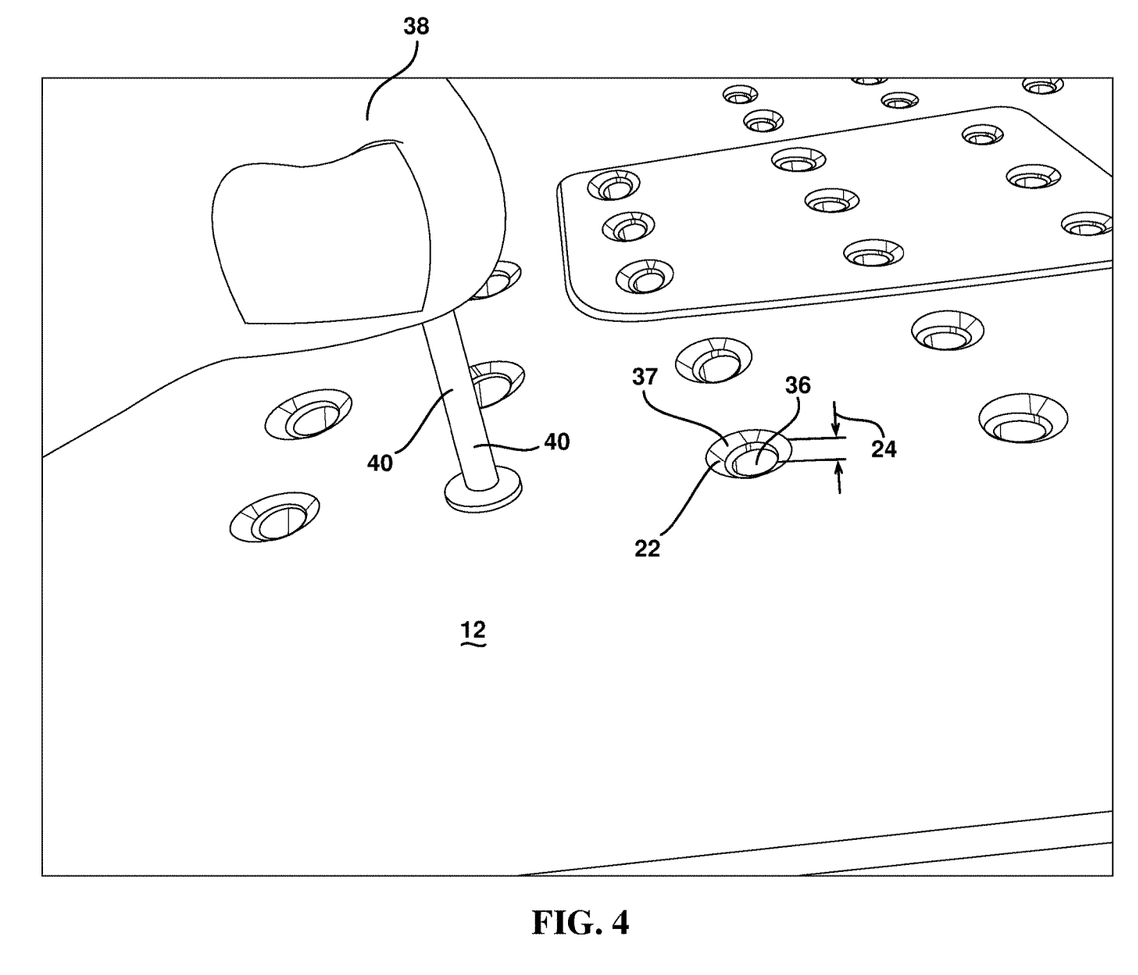
FIG. 4 is a view showing a rivet countersink go/no-go gauge used to check the size of the countersinks formed in a top structure of an apparatus according to one exemplary embodiment of the present disclosure.

Referring now to FIG. 4, a schematic view of a portion of an outer structure 12 having a plurality of countersink apertures 22 formed therein is illustrated. Each countersink aperture 22 includes a conical angled wall 37 formed in an upper portion of the outer structure 12 and a circular through aperture 36 formed in a lower portion of the outer structure 12. A hand of a technician 38 is shown grasping a go/no-go gauge 40 to check whether the countersink aperture 22 is formed to the proper depth to seat a rivet (not shown). In this manner the countersink apertures 22 for the rivets can be quickly checked with the go/no-go gauge 40 to aid the technician in determining whether each countersink apertures is sized correctly. By using the gauge 40 to check each rivet countersink 22, a quick "go/no-go" determination can be made without having to install a rivet and then subsequently having to remove the rivet if the rivet is not seated properly.

Figure 5:
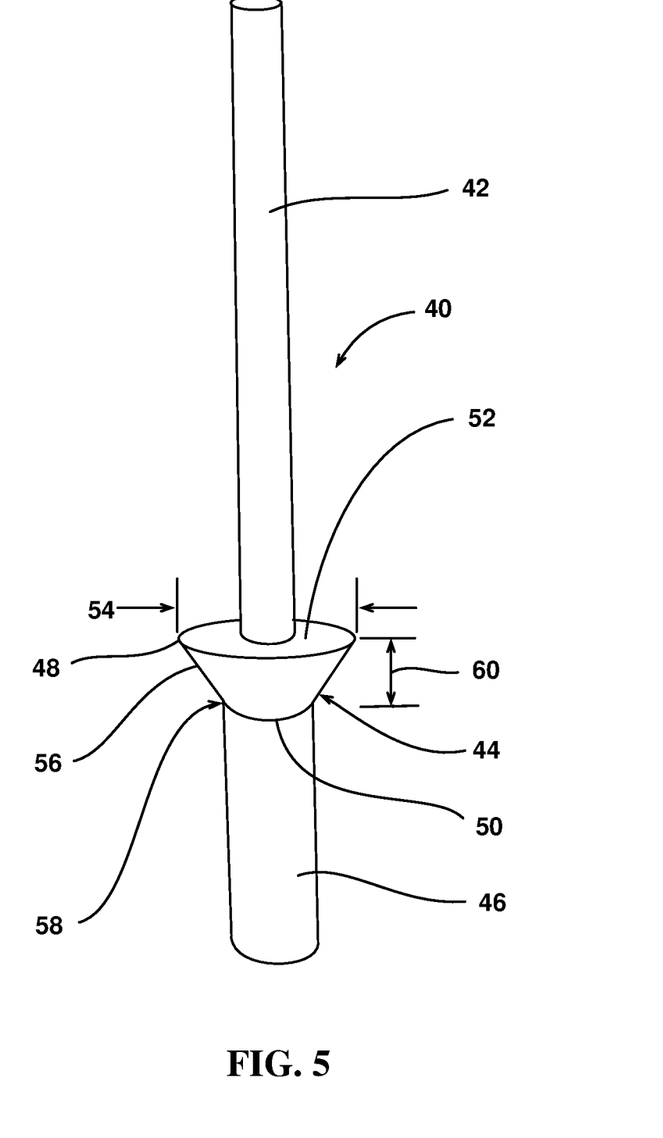
FIG. 5 is a perspective view of a rivet countersink go/no-go gauge according to one exemplary embodiment of the present disclosure.

Referring now to FIG. 5, a perspective view of a countersink go/no-go gauge 40 is depicted. The gauge 40 includes a grip shaft 42 extending from a first end 48 of a gauge head 44. A cylindrical extension 46 projects from an opposing second end 50 of the gauge head 44. A circular top wall 52 of the gauge head 44 is defined by a major diameter 54 that is substantially equivalent to a size of a rivet head that will be inserted into a countersink aperture 22. An angular side wall 56 tapers inward from the top wall 52 to the second end 50 having a minor diameter 58 that is smaller than the major diameter 54 to form a cone shaped head 44. In one form the diameter of the cylindrical extension 46 is substantially equivalent in size to the minor diameter 58 of the gauge head 44. In other forms the cylindrical extension can be smaller in diameter than that of the minor diameter 58. A length or depth 60 of the gauge head 44 is defined as the distance between the first and second ends 48, 50, respectively. A length of the grip shaft 42 is larger than a length or depth of the gauge head 44 defined between the first and second ends. In some forms the length of the grip shaft 42 is as long as or longer than the depth of the gauge head 44 and the length of the cylindrical extension 46 combined. The gauge 40 is formed from a relative stiff material such as a metal, metal alloy, a plastic or a composite.

Figure 6:
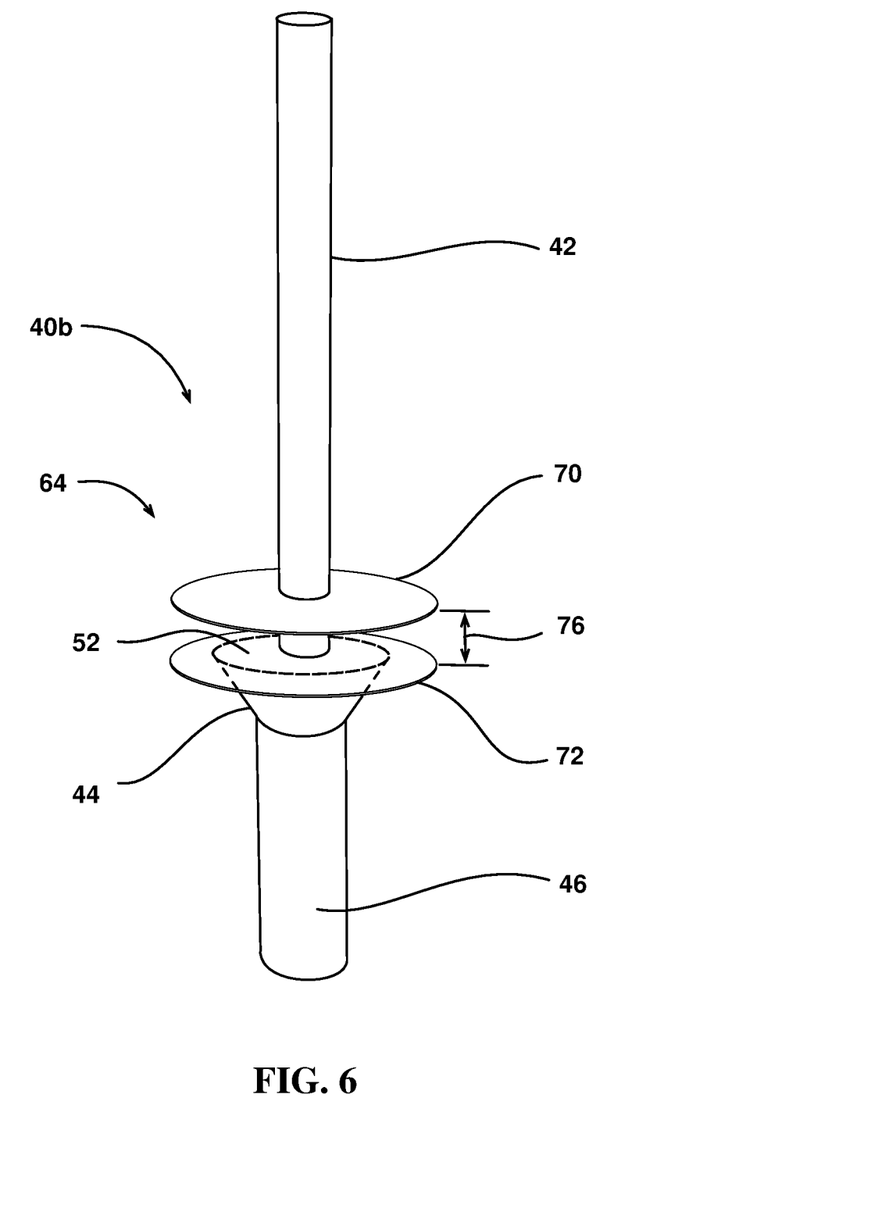
FIG. 6 is a perspective view of a rivet countersink go/no-go gauge according to another exemplary embodiment of the present disclosure.

Referring now to FIG. 6, a countersink go/no-go gauge 40b according to an alternate embodiment is depicted in a perspective view. The gauge 40b is substantially similar to the gauge 40 shown in FIG. 5, however a tolerance feature 64 is included so that the gauge 40b can more accurately assist in determining whether a countersink aperture 22 is formed according the required dimensions within a prescribed tolerance band. The tolerance feature 64 can include an upper tolerance member 70 and a lower tolerance member 72 spaced apart from one another by a prescribed tolerance height 76. The tolerance members 70, 72 can be positioned in a plurality of locations relative to the gauge head 44. As illustrated the upper tolerance member 70 is above the top wall 52, however in other forms the upper tolerance member can be positioned at or below the top wall 52 of the head 44. With the configuration shown in FIG. 6, the countersink aperture 22 is appropriately sized if the gauge 40b is seated such that the top surface of the outer structure 12 is located somewhere between the upper and lower tolerance members 70, 72, respectively. The can be determined by the lower tolerance member 72 being flexed upward due to engagement with the outer structure 12 and the upper tolerance member 70 being free from engagement when the head 44 is inserted into a countersink aperture 22. The tolerance members 70, 72 are relatively flexible and can be formed from a number of different materials including, but not limited to a rubber material or a flexible plastic material. In the exemplary embodiment the tolerance members 70. 72 are illustrated as a circular element, however other configurations are contemplated. For example the tolerance members may include one or more linear extensions protruding radially outward from the grip shaft 42 and/or the gauge head 44. Other geometric configurations are also contemplated herein.

Figure 7:
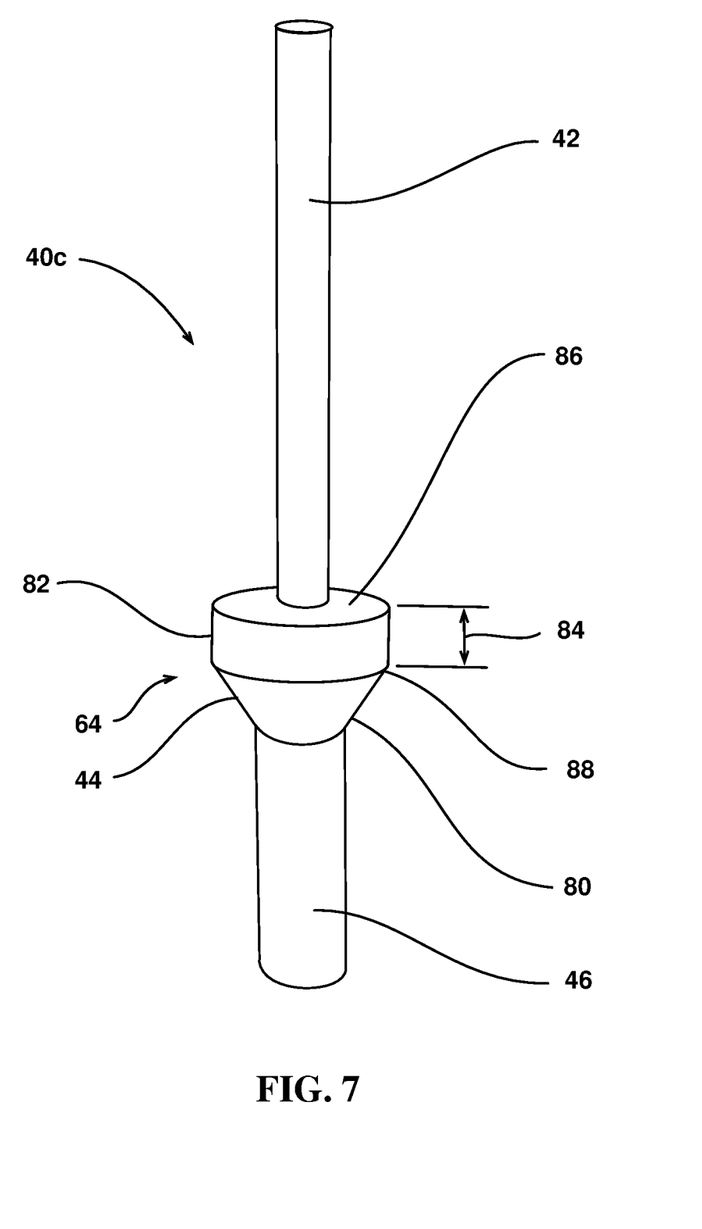
FIG. 7 is a perspective view of a rivet countersink go/no-go gauge according to another exemplary embodiment of the present disclosure.

Referring now to FIG. 7, a countersink go/no-go gauge 40c according to another embodiment is depicted in a perspective view. The gauge 40c is substantially similar to the gauge 40 shown in FIG. 5, however a tolerance feature 64 is included so that the gauge 40c can more accurately assist in determining whether a countersink aperture 22 is formed according the required dimensions within a prescribed tolerance band.

The tolerance feature 64 includes a head 44 having a cylindrical portion 82 44 extending along a tolerance height 84 between a top wall 86 and a cone shaped portion 80. With the configuration shown in FIG. 7, the countersink aperture 22 is appropriately sized if the gauge 40c is seated such that the top surface of the outer structure 12 is located somewhere along the cylindrical portion 82 of the head 44.

Figure 8:
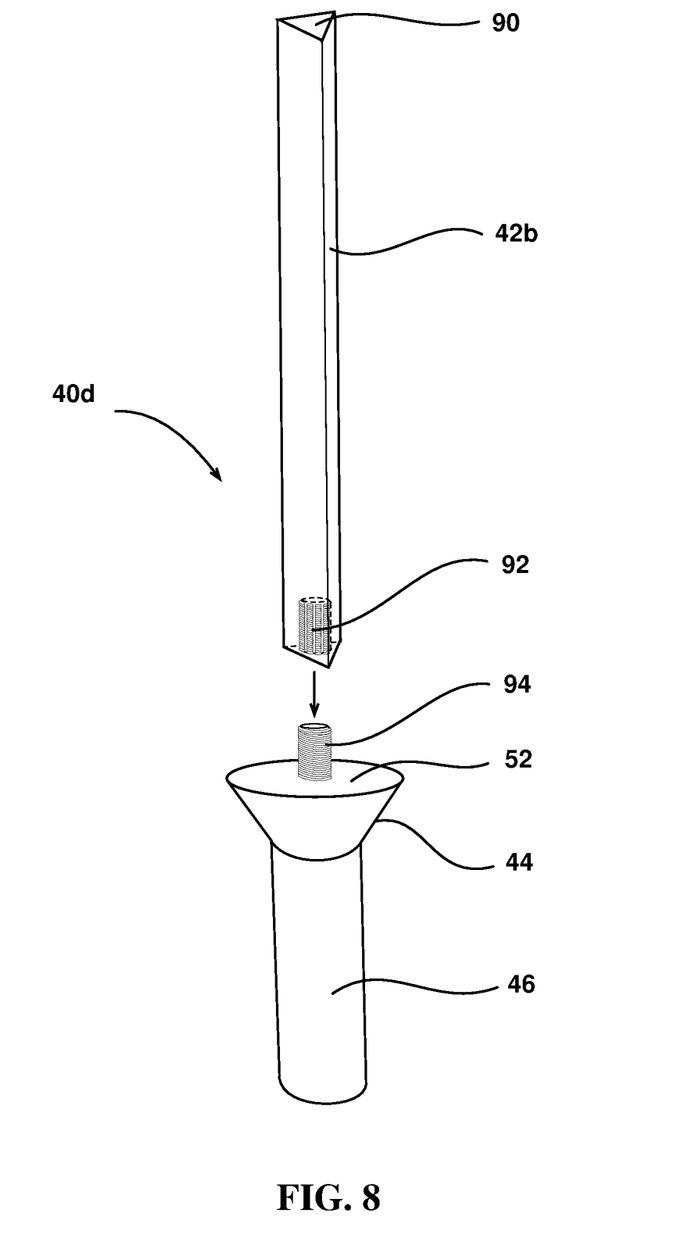
FIG. 8 is a perspective view of a rivet countersink go/no-go gauge according to another exemplary embodiment of the present disclosure.

Referring now to FIG. 8, a countersink go/no-go gauge 40d according to another embodiment is depicted in a perspective view. The gauge 40d includes a removable grip shaft 42b. The grip shaft 42b can include a cross-sectional shape that is non-cylindrical such as the triangular shape shown, however other geometric configurations such as a square, rectangular or other regular and irregular shapes are contemplated by the present disclosure. An internal threaded receiver 92 can be formed within the removable grip shaft 42b at an end thereof. In this disclosed embodiment, a threaded stud 94 extending from the top wall 52 of the head 44 is threadingly engageable with the threaded receiver 92. In this manner differently shaped grip shafts 42b may be used with the gauge 44d. It should be noted that the cylindrically shaped grip shafts 42b shown in other embodiments may be threadably connected to the gauge head 44 as well.

Figures 9A, 9B, 9C:
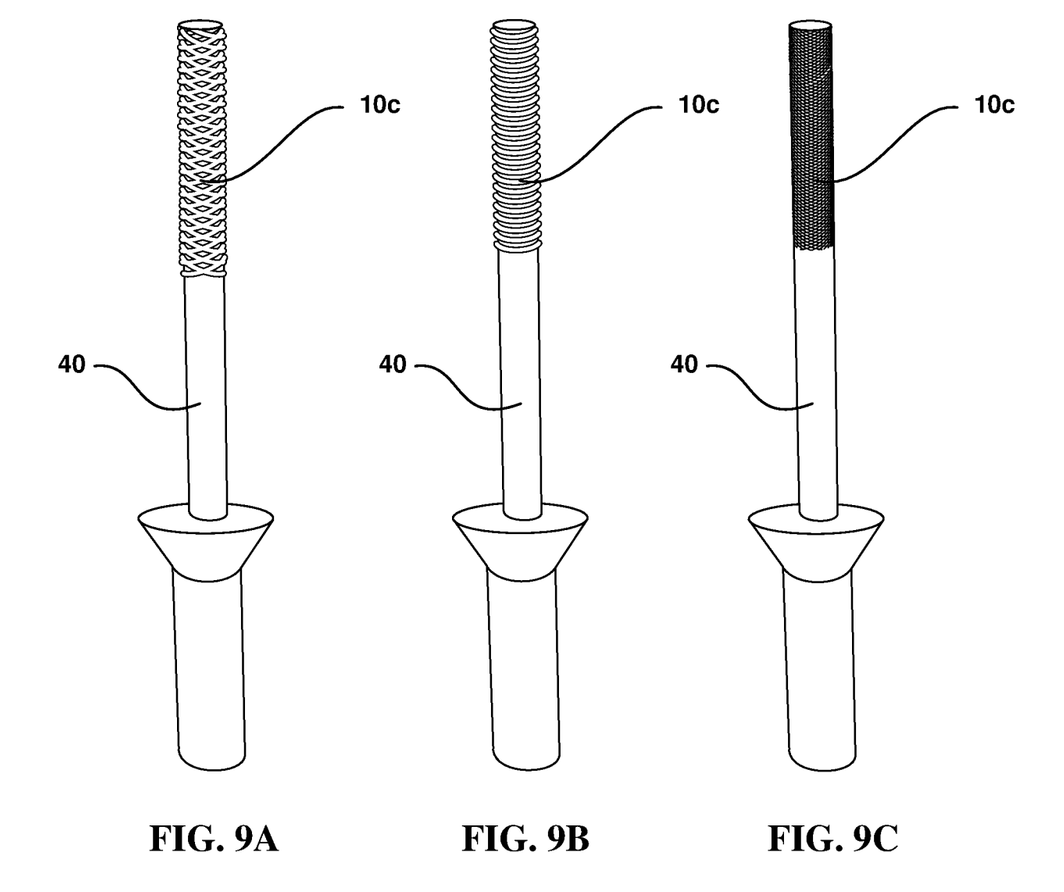
FIGS. 9A, 9B and 9C are perspective views of exemplary rivet countersink go/no-go gauges with different gripping features formed on the stems thereof.

FIGS. 9A, 9B and 9C show grip shafts with optional gripping features 100 that may be used to enhance gripping by the technician. The grip feature 100 can include, but is not limited to a cross-hatched protruding rib pattern as shown in FIG. 9A, a circular protruding rib pattern as shown in FIG. 9B and a protruding knurling pattern as shown in FIG. 9C. Knurling is a manufacturing process, typically conducted on a lathe, whereby a pattern of straight, angled or crossed lines is cut or rolled into the material.

In one aspect, the present disclosure includes a system comprising a countersink go/no-go gauge for a rivet comprising a head having a first end and a second end; a depth of the head defined as a distance between the first end and the second end; a top wall positioned at the first end of the head, the top wall having circular perimeter defined by a major diameter; an inwardly extending angular wall extending from the top wall to the second end of the head, the second end defined by a minor diameter smaller than the major diameter; and a gripping shaft extending from the top wall of the head.

In refining aspects the present disclosure includes a length of the shaft is greater than the depth of the head; a cylindrical extension projecting from the second end of the head; the cylindrical extension has a cross-sectional circular diameter substantially equal to the minor diameter of the second end of the head; wherein the length of the shaft is at least as long as head and the cylindrical extension combined; wherein the shaft includes a threaded receiver threadingly engageable with a threaded stud extending from the top wall of the head; wherein the shaft includes a gripping feature formed on the surface thereof; wherein the depth of the head is substantially equal to a desired depth of a countersink aperture; wherein the countersink aperture is formed in a sheet metal structure of an aircraft; and a tolerance feature associated with the gauge configured to provide a banding of acceptable depths for the countersink aperture.

In another aspect, the present disclosure includes a countersink gauge comprising a head having a cone shape with a depth defined between first and second ends; a circular top wall having a first diameter formed at the first end and a bottom wall having a second diameter smaller than the first diameter formed at the second end of the head; a shaft extending from the top wall of the head; and a tolerance feature associated with the head of the countersink gage.

In refining aspects the present disclosure includes a shaft that is threadingly engaged with the head; wherein the shaft includes gripping feature formed therewith; wherein the gripping feature includes protruding elements and/or flat wall portions formed on an outer wall of the shaft, wherein tolerance feature includes a cylindrical upper portion extending between the top wall of the head and a cone shaped portion of the head; wherein tolerance feature includes a least one upper tolerance member and at least one lower tolerance member extending radially outward from gauge; wherein each of the tolerance members are flexible; a cylindrical extension projecting from the bottom wall of the head; wherein the head and the cylindrical extension is substantially identical in size and shape to that of a rivet configured for mechanically fastening sheet metal to an aircraft body.

In another aspect, the present disclosure includes a method comprising gripping a shaft extending from a head of a go/no-go gage; positioning the head of the gauge into a countersink aperture formed in a structure; engaging an angular side wall surface of the head with an angular side wall the countersink aperture; determining whether a top surface of the head is substantially flush with a top surface of the structure, wherein substantially flush is defined within a desired tolerance band; and removing the head from the countersink aperture with the shaft.

In refining aspects the present disclosure includes reworking the countersink aperture if the top surface of the gage was not substantially flush with the top surface of the plate; and riveting the structure after determining that a size of countersink aperture is acceptable with the go/no-go gage.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A countersink go/no-go gauge for a rivet comprising:
   a head having a first end and a second end;
   a depth of the head defined as a distance between the first end and the second end;
   a top wall positioned at the first end of the head, the top wall having circular perimeter defined by a major diameter;
   an inwardly extending angular wall extending from the top wall to the second end of the head, the second end defined by a minor diameter smaller than the major diameter; and
   a gripping shaft extending from the top wall of the head; and
   a tolerance feature associated with the gauge configured to provide a banding of acceptable depths for the countersink aperture, wherein the tolerance feature includes at least one flexible member extending from the head.

2. The countersink gauge of claim 1, wherein a length of the shaft is greater than the depth of the head.

3. The countersink gauge of claim 1 further comprising a cylindrical extension projecting from the second end of the head.

4. The countersink gauge of claim 3, wherein the cylindrical extension has a cross-sectional circular diameter substantially equal to the minor diameter of the second end of the head.

5. The countersink gauge of claim 3, wherein the length of the shaft is at least as long as head and the cylindrical extension combined.

6. The countersink gauge of claim 1, wherein the shaft includes a threaded receiver threadingly engageable with a threaded stud extending from the top wall of the head.

7. The countersink gauge of claim 1, wherein the shaft includes a gripping feature formed on the surface thereof.

8. The countersink gauge of claim 1 wherein the depth of the head is substantially equal to a desired depth of a countersink aperture.

9. The countersink gauge of claim 8, wherein the countersink aperture is formed in a sheet metal structure of an aircraft.

10. A countersink gauge comprising:
a head having a cone shape with a depth defined between first and second ends;
a circular top wall having a first diameter formed at the first end and a bottom wall having a second diameter smaller than the first diameter formed at the second end of the head;
a shaft extending from the top wall of the head; and
a tolerance feature associated with the head of the countersink gauge; and
wherein the tolerance feature includes a least one upper tolerance member and at least one lower tolerance member extending radially outward from gauge.

11. The countersink gauge of claim 10, wherein the shaft is threadingly engaged with the head.

12. The countersink gauge of claim 10, wherein the shaft includes gripping feature formed therewith.

13. The countersink gauge of claim 12, wherein the gripping feature includes protruding elements and/or flat wall portions formed on an outer wall of the shaft.

14. The countersink gauge of claim 10, wherein tolerance feature includes a cylindrical upper portion extending between the top wall of the head and a cone shaped portion of the head.

15. The countersink gauge of claim 10, wherein each of the tolerance members are flexible.

16. The countersink gauge of claim 10 further comprising a cylindrical extension projecting from the bottom wall of the head.

17. The countersink gauge of claim 10 wherein the head and the cylindrical extension is substantially identical in size and shape to that of a rivet configured for mechanically fastening sheet metal to an aircraft body.

18. A method comprising: gripping a shaft extending from a head of a go/no-go gage; positioning the head of the gauge into a countersink aperture formed in a structure; engaging an angular side wall surface of the head with an angular side wall the countersink aperture; determining whether a top surface of the head is substantially flush with a top surface of the structure, wherein substantially flush is defined within a desired tolerance band; wherein the tolerance band is defined by at least one upper tolerance member and at least one lower tolerance member extending radially outward from the head; and removing the head from the countersink aperture with the shaft.

* * * * *